(12) United States Patent
Peng et al.

(10) Patent No.: US 10,435,989 B2
(45) Date of Patent: Oct. 8, 2019

(54) MULTI-STAGE TREATMENT FOR IRON SULFIDE SCALES

(71) Applicant: Multi-Chem Group, LLC, San Angelo, TX (US)

(72) Inventors: Yang Peng, Kingwood, TX (US); Zhiwei Yue, Sugar Land, TX (US); Chunfang Fan, Houston, TX (US)

(73) Assignee: Multi-Chem Group, LLC, Houston, TX (US)

( * ) Notice: Subject to any disclaimer, the term of this patent is extended or adjusted under 35 U.S.C. 154(b) by 223 days.

(21) Appl. No.: 15/527,905

(22) PCT Filed: Dec. 23, 2014

(86) PCT No.: PCT/US2014/072127
§ 371 (c)(1),
(2) Date: May 18, 2017

(87) PCT Pub. No.: WO2016/105381
PCT Pub. Date: Jun. 30, 2016

(65) Prior Publication Data
US 2018/0347316 A1    Dec. 6, 2018

(51) Int. Cl.
*E21B 37/06*    (2006.01)
*E21B 41/02*    (2006.01)
*C09K 8/528*    (2006.01)
*C09K 8/40*    (2006.01)
(Continued)

(52) U.S. Cl.
CPC .............. *E21B 37/06* (2013.01); *C09K 8/40* (2013.01); *C09K 8/528* (2013.01); *C09K 8/532* (2013.01);
(Continued)

(58) Field of Classification Search
CPC ...... C09K 2208/32; C09K 8/74; C09K 8/532; C09K 8/528; C09K 8/54; C09K 8/72; C09K 8/52; E21B 37/06; E21B 41/02
See application file for complete search history.

(56) References Cited

U.S. PATENT DOCUMENTS

| 4,633,949 A | 1/1987 | Crowe |
| 6,068,056 A | 5/2000 | Frenier et al. |

(Continued)

FOREIGN PATENT DOCUMENTS

EP    1278939 B1    1/2014

OTHER PUBLICATIONS

Wang, Xiaolan, et al. "Iron Sulfide Removal: A Nonacidic Alternative to Hydrochloric Acid Treatment." SPE European Formation Damage Conference & Exhibition. Society of Petroleum Engineers, 2013.

(Continued)

*Primary Examiner* — Zakiya W Bates
(74) *Attorney, Agent, or Firm* — Tenley Krueger; Baker Botts L.L.P.

(57) ABSTRACT

Multi-stage treatment methods for the treatment or removal of iron sulfide scales in subterranean operations and operations involving the production and/or transportation of oil and gas. In one embodiment, the methods include identifying one or more types of iron sulfide scale present in a portion of a subterranean formation; introducing a first treatment composition comprising an acid into at least a portion of the subterranean formation to partially dissolve the iron sulfide scale therein; and introducing a second treatment composition into the portion of the subterranean formation after the first treatment composition, the second treatment composition comprising an iron sulfide treating additive selected based at least in part on a type of iron sulfide scale identified in the subterranean formation.

20 Claims, 3 Drawing Sheets

(51) Int. Cl.
*C09K 8/532* (2006.01)
*E21B 47/00* (2012.01)

(52) U.S. Cl.
CPC .............. *E21B 41/02* (2013.01); *E21B 47/00* (2013.01); *C09K 2208/20* (2013.01); *C09K 2208/32* (2013.01)

(56) References Cited

U.S. PATENT DOCUMENTS

| | | | |
|---|---|---|---|
| 7,380,602 | B2 | 6/2008 | Brady et al. |
| 7,855,171 | B2 | 12/2010 | Trahan |
| 2007/0175635 | A1 | 8/2007 | Ke et al. |
| 2016/0176735 | A1* | 6/2016 | Balasubramanian ..... C02F 1/50 210/729 |

OTHER PUBLICATIONS

Yap, Juliet, et al. "Removing Iron Sulfide Scale: A Novel Approach." Abu Dhabi International Petroleum Exhibition and Conference. Society of Petroleum Engineers, 2010.

Wang, Qiwei, et al. "Iron Sulfide Scale Dissolvers: How Effective Are They?." SPE Saudi Arabia Section Technical Symposium and Exhibition. Society of Petroleum Engineers, 2013.

Chen, Tao, et al. "Development of Environmental Friendly Iron Sulfide Inhibitors for Field Application." SPE International Symposium on Oilfield Chemistry. Society of Petroleum Engineers, 2009.

Ford, W. G. F., et al. "Removing a typical iron sulfide scale: the scientific approach." SPE Rocky Mountain Regional Meeting. Society of Petroleum Engineers, 1992.

Lehmann, Marc, and Faezeh Fafa Firouzkouhi. "A New Chemical Treatment to Inhibit Iron Sulfide Deposition and Agglomeration." SPE International Oilfield Scale Conference. Society of Petroleum Engineers, 2008.

International Search Report and Written Opinion issued in related PCT Application No. PCT/US2014/072127 dated Aug. 27, 2015, 12 pages.

* cited by examiner

MULTI-STAGE TREATMENT FOR IRON SULFIDE SCALES

CROSS-REFERENCE TO RELATED APPLICATION

The present application is a U.S. National Stage Application of International Application No. PCT/US2014/072127 filed Dec. 23, 2014, which is incorporated herein by reference in its entirety for all purposes.

BACKGROUND

The present disclosure relates to systems and methods for the removal of iron sulfide scales in subterranean operations and operations involving the production and/or transportation of oil and gas.

Hydrogen sulfide, $H_2S$, is a naturally occurring contaminant of fluids that is encountered in many industries, including the oil and gas industry and the paper industry. The corrosive nature of $H_2S$ and its reaction with steel and other metals used in those industries causes the accumulation of particulate iron sulfide scales. Iron sulfide scale may become entrained in hydrocarbons, glycol, salts, and the like to form deposits on the surfaces in subterranean formations and surfaces of conduits (e.g., pipelines, well casings, production tubing), containers, equipment, and other metal surfaces in oil and gas production. Such deposits may present significant problems, among other reasons, because the deposits may hinder accurate determinations of pipeline structural integrity, block the flow of fluids through conduits, pipelines, or pore spaces in a subterranean formation, and/or interfere with the operation of pumps, valves, and other metal equipment. Severe iron sulfide scaling also may choke production, either in the production tubing, perforations or within the producing formation itself.

Such iron sulfide scales may be removed mechanically (e.g., via milling, scrubbing, or jetting), or an acid (e.g., HCl) or other chemical additive may be used to dissolve or disperse the scales. However, there are significant risks associated with certain acid treatments in high temperature, high-pressure gas wells. These may include corrosivity of acid at high temperature and the generation of toxic $H_2S$ gas during the treatment. The acids and other chemicals used in the treatments themselves also may present safety and handling risks.

Moreover, many iron sulfide scale deposits are not homogenous, instead comprising two, three, or more different types of iron sulfides. Depending on factors such as the age of the scale, environmental temperature, and pressure, iron sulfides exist in several distinct forms with different crystalline structures, different ratios of sulfur to iron and different properties. The most common iron sulfide crystalline forms are pyrite ($FeS_2$), troilite (FeS), pyrrhotite ($Fe_7S_8$), mackinawite ($Fe_9S_8$), and marcasite ($FeS_2$). However, the acid or chemical additive chosen for a particular application may dissolve certain types of iron sulfide scales, but may leave other types relatively undisturbed in the treated area.

BRIEF DESCRIPTION OF THE DRAWINGS

These drawings illustrate certain aspects of some of the embodiments of the present disclosure, and should not be used to limit or define the claims.

Figure 1A:
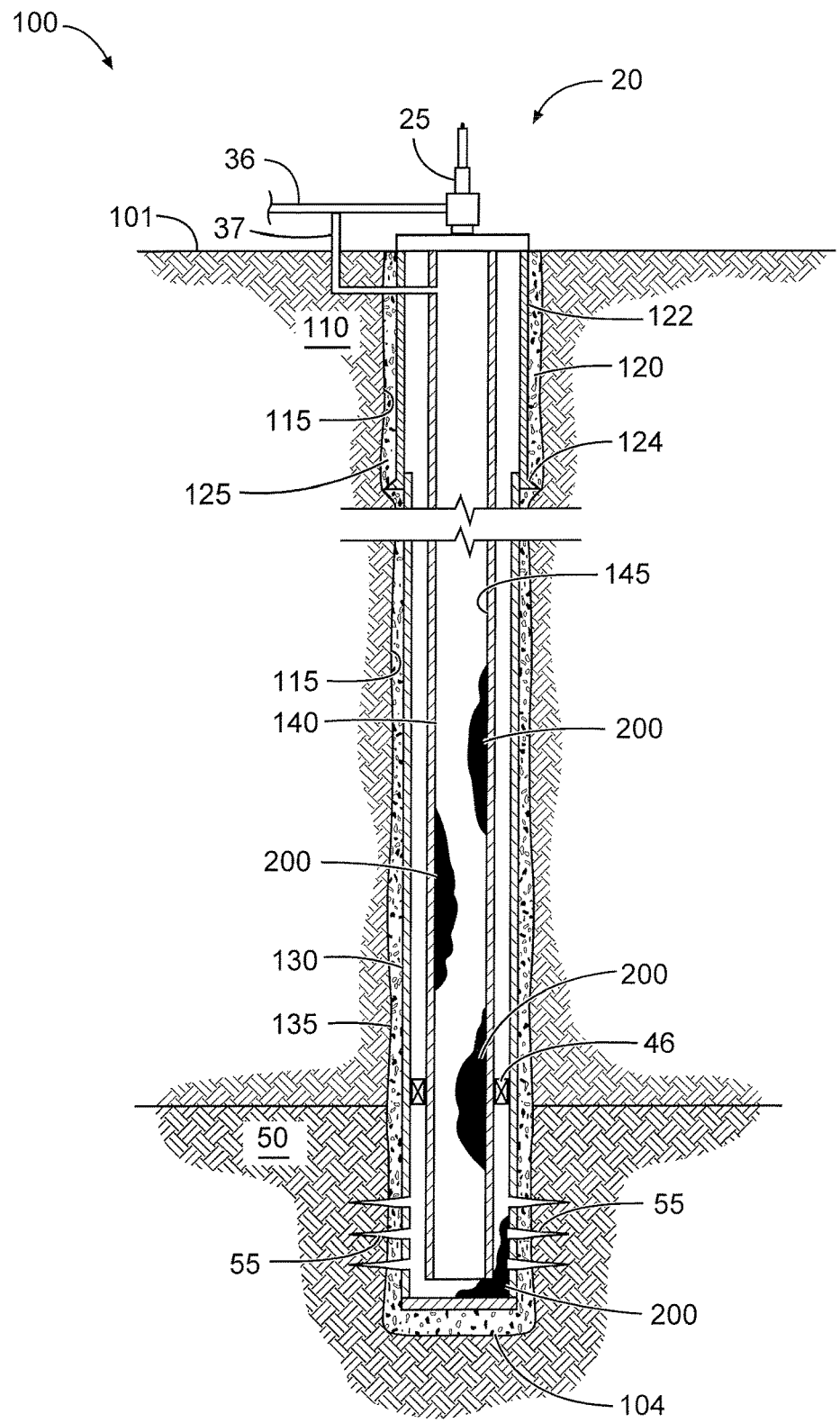
FIGS. 1A, 1B, and 1C are diagrams illustrating a well site where a treatment according to the present disclosure may be used.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF CERTAIN EMBODIMENTS

The present disclosure relates to systems and methods for the treatment of iron sulfide scales in subterranean operations and operations involving the production and/or transportation of oil and gas.

More particularly, the present disclosure relates to methods and systems for a multi-stage (e.g., at least two stages) treatment method for the removal of iron sulfide scales from subterranean formations, conduits (e.g., pipelines), containers (e.g., tanks), and/or other equipment used in oil and gas operations. In the first stage, a treatment composition (e.g., a treatment solution) comprising an acid is introduced in the area where iron sulfides may be present. In certain embodiments, the treatment solution of this first stage may be formulated to at least partially dissolve certain iron sulfide scales (e.g., at least a top layer of such iron sulfides) as well as any oxides or other solid deposits that may reside on the top layer of those iron sulfide deposits. Without limiting the disclosure to any particular theory or mechanism, the first treatment solution may "activate" the surface of the iron sulfide scales remaining after the first stage, removing any other solids and making the iron sulfides more readily dissolvable and/or reactive for subsequent treatments. In certain embodiments, this first stage may use a lower concentration of acid than that used in conventional acid treatments, among other things, to reduce corrosion. In the second stage, at least a second treatment composition (e.g., a treatment solution) comprising an iron sulfide treating additive is introduced into the area treated in the first stage. The iron sulfide treating additives used in this second stage are selected for their ability to dissolve or disperse one or more specific types of iron sulfide scales identified in the treated area (e.g., in a sample of the scale taken from the area for laboratory analysis). In certain embodiments, the treatment compositions used in the second stage may not comprise a significant amount of acid. In certain embodiments, the methods and systems of the present disclosure may include introducing subsequent treatment compositions after the second treatment composition (e.g., a third treatment composition) comprising additives selected for their ability to dissolve additional types of iron sulfide scales identified in the treated area that were not removed by the second treatment composition.

Among the many potential advantages to the methods and compositions of the present disclosure, only some of which are alluded to herein, the methods, compositions, and systems of the present disclosure may remove non-homogenous iron sulfide scale deposits more effectively and/or with less shut-in or shut-down time than conventional treatments where only a single stage is used. The methods, compositions, and systems of the present disclosure may allow for more flexible treatment of iron sulfides, which may be tailored for particular applications and/or formations. In some cases, these treatments may facilitate the removal of certain types of iron sulfide scales that may have been ignored or overlooked in prior treatments in the art. In certain embodiments, the treatments of the present disclosure may present less risk of corrosion, toxicity (e.g., due to $H_2S$) and/or damage to a subterranean formation, pipeline, and/or other equipment, in particular, where these treatments use less acid than conventional treatments.

The acid used in the first stage of the methods of the present disclosure may comprise any acid known in the art (or any combination thereof). In certain embodiments, the acid may comprise one or more organic acids, i.e., acids comprising one or more carbon atoms. Examples of organic acids that may be suitable in certain embodiments include, but are not limited to, formic acid, acetic acid, citric acid, glycolic acid, lactic acid, 3-hydroxypropionic acid, aminocarboxlate acid, diethylene triamine pentaacetic acid (DTPA), and any combination thereof. Alternatively or in combination with one or more organic acids, the organic acid may be provided as a salt of an organic acid. A "salt" of an acid, as that term is used herein, refers to any compound that shares the same base formula as the referenced acid, but one of the hydrogen cations thereon is replaced by a different cation (e.g., an antimony, bismuth, potassium, sodium, calcium, magnesium, cesium, or zinc cation). Examples of salts of organic acids include that may be suitable in certain embodiments include, but are not limited to, sodium acetate, sodium formate, calcium acetate, calcium formate, cesium acetate, cesium formate, potassium acetate, potassium formate, magnesium acetate, magnesium formate, zinc acetate, zinc formate, antimony acetate, antimony formate, bismuth acetate, bismuth formate, and any combination thereof. The organic acid may be used in any amount and/or concentration sufficient to partially dissolve the iron sulfide scales without causing significant corrosion and/or damage in the area where it is used. In certain embodiments, the organic acid (or its salt) may be provided in a solution having a concentration of from about 1% to about 100%. In certain embodiments, the organic acid (or its salt) may be provided in a solution having a concentration of from about 30% to about 70%.

In certain embodiments, the treatment solution used in the first stage may further comprise a hydrogen sulfide scavenger. The hydrogen sulfide scavenger used in the first stage of the methods of the present disclosure may comprise any hydrogen sulfide scavengers known in the art (or any combination thereof). The hydrogen sulfide scavengers may be used to prevent or reduce the release of toxic $H_2S$ gas generated by the reaction of the organic acid with the iron sulfide scales. Examples of hydrogen sulfide scavengers that may be suitable for use in certain embodiments include, but are not limited to: zinc-containing compounds, aldehyde-based compounds (e.g., formaldehyde, acrolein, etc.), triazine-based compounds, non-amine based $H_2S$ scavengers, and any combinations thereof. The hydrogen sulfide scavengers may be used in the first stage of the methods of the present disclosure in any amount sufficient to reduce the amount of free hydrogen sulfide below safe levels in the particular application. In certain embodiments, the hydrogen sulfide scavenger may be provided in a solution having a concentration of from about 1% to about 10%.

In certain embodiments, the treatment solution used in the first stage may further comprise a corrosion inhibitor. The corrosion inhibitor used in the first stage of the methods of the present disclosure may comprise any corrosion inhibitor known in the art (or any combination thereof). The corrosion inhibitor may be used to prevent or reduce metal corrosion caused by the organic acid. Examples of corrosion inhibitors that may be suitable for use in certain embodiments include, but are not limited to: quaternary nitrogen (e.g., ammonium) compounds; amides; imidazolines; nitrogen salts of certain carboxylic acids (e.g., fatty acids and napthenic acids); polyoxylated amines, amides, and imidazolines; nitrogen-containing heterocyclic compounds; carbonyl compounds; silicate-based inhibitors; thioacetals; and any combinations thereof. The corrosion inhibitor may be used in the first stage of the methods of the present disclosure in any amount sufficient to adequately reduce the risk of metal corrosion in the particular application. In certain embodiments, the corrosion inhibitor may be provided in a solution having a concentration of from about 0.1% to about 10%.

The iron sulfide treatment additive used in the second stage may comprise any additive a chosen for its ability to dissolve and/or disperse one or more types of iron sulfide scales identified in the area to be treated. In certain embodiments, the iron sulfide treatment additive used in the second stage does not comprise a significant amount of any strong acid. In certain embodiments, the iron sulfide treatment additive may comprise: one or more chelators such as trishydroxymethylphosphine (THP), tetrakis(hydroxymethyl)phosphonium sulfate (THPS), or ethylenediaminetetraacetic acid (EDTA); gluconate; reducing agents; acrolein; and any combinations thereof. In other embodiments, the iron sulfide treatment additive may comprise one or more weak acids (which may not cause significant corrosion of metal surfaces, as compared to a strong acid).

The treatment compositions of the present disclosure may comprise liquid solutions of the specified additives or treatment fluids comprising a carrier fluid and the specified additives. The treatment solutions used in the methods and systems of the present disclosure may comprise any solvent known in the art, including but not limited to water, alcohols, other organic solvents, or combinations or mixtures thereof. Suitable carrier fluids may include aqueous fluids, non-aqueous fluids, and combinations thereof. In certain embodiments, the treatment fluids and/or solutions of the present disclosure optionally may comprise any number of additional additives. Examples of such additional additives include, but are not limited to, salts, surfactants, diverting agents, fluid loss control additives, gas, nitrogen, carbon dioxide, foamers, additional corrosion inhibitors, additional scale inhibitors, catalysts, clay control agents, biocides, friction reducers, antifoam agents, bridging agents, flocculants, additional $H_2S$ scavengers, $CO_2$ scavengers, oxygen scavengers, lubricants, viscosifiers, breakers, weighting agents, relative permeability modifiers, wetting agents, filter cake removal agents, antifreeze agents (e.g., ethylene glycol), and the like. For example, in certain embodiments, the second treatment composition of the present disclosure may further comprise one or more surfactants, among other reasons, to help suspend any undissolved iron sulfide solids so that they can be removed from the treated area. A person skilled in the art, with the benefit of this disclosure, will recognize the types of additives that may be included in the fluids of the present disclosure for a particular application.

The methods and compositions of the present disclosure may be used in a variety of environments or target regions where iron cations and sulfide anions capable of forming iron sulfide scales may be found. As previously noted, the two-stage treatments of the present disclosure may be used in subterranean operations, e.g., in well bores penetrating subterranean formations. However, the methods and compositions of the present disclosure may also be used in applications on the surface. For example, the first and second treatment compositions of the present disclosure may be added to fluids passing through a pipeline or other flow line. Such treatments may remove iron sulfide scale deposits in the pipeline or other flow line much the same way as they would in a subterranean formation. The methods and compositions of the present disclosure are broadly applicable to pipe systems, vessels, filters, filter separators, gas meter equipment that are contaminated with or measure the presence of iron sulfide deposits. The pipe systems include vessels that carry water, gas, or other fluids. The natural gas pipe systems may contain dry gas, as defined by the oil and gas industry as containing less than 7 pounds of water per 1 million standard cubic feet of natural gas, or contain moisture at volumes above dry gas standard. The natural gas pipe systems may contain gas condensate, oil or other finished petroleum products.

In the methods and systems of the present disclosure, one or more particular types of iron sulfide scales residing in the area to be treated are identified. This may be accomplished by any means known in the art, such as taking a sample of the scales from the area to be treated. For example, one or more downhole sampling tools (e.g., slickline tools such as bailers) may be used to take a sample of solid scales from inside a production tubing, a well bore, and/or a subterranean formation. These scale samples may be analyzed to identify the type of iron sulfide scale and/or other components (e.g., oxides, other scales, etc.). In other embodiments, fluid samples may be obtained from the well at the surface and analyzed to identify the types of one or more iron sulfides dissolved, dispersed, and/or suspended therein.

The timing and duration of the techniques of the present disclosure may vary under different circumstances. For example, in certain embodiments, the multi-stage treatments of the present disclosure may be performed in a wellbore, subterranean formation, or conduit for a limited period of time, for example, with batch injections that may be used to remove iron sulfide scales on an as-needed basis, or that may repeated at certain scheduled times, among other reasons, to prevent iron sulfide scale deposits from exceeding certain levels. Alternatively, a batch injection of the compositions of the present disclosure can be used where iron sulfide deposits are removed using pipeline pigging methods. The duration of each stage may also vary. For example, in certain embodiments, the treatment composition of each stage (e.g., the first stage) may be introduced into the area to be treated and allowed to treat the area for about 24 hours before the treatment composition of the next stage (e.g., the second stage) is introduced or the well, conduit, or equipment is returned to operation. In some embodiments, one or more spacer fluids or preflushes/afterflushes may be introduced and/or circulated in the treated area between two different stages of a treatment of the present disclosure, among other reasons, to remove any loose solids in the treated area and/or any additives from the previous stage that may be incompatible with the following stage(s) of treatment.

Figure 1B:
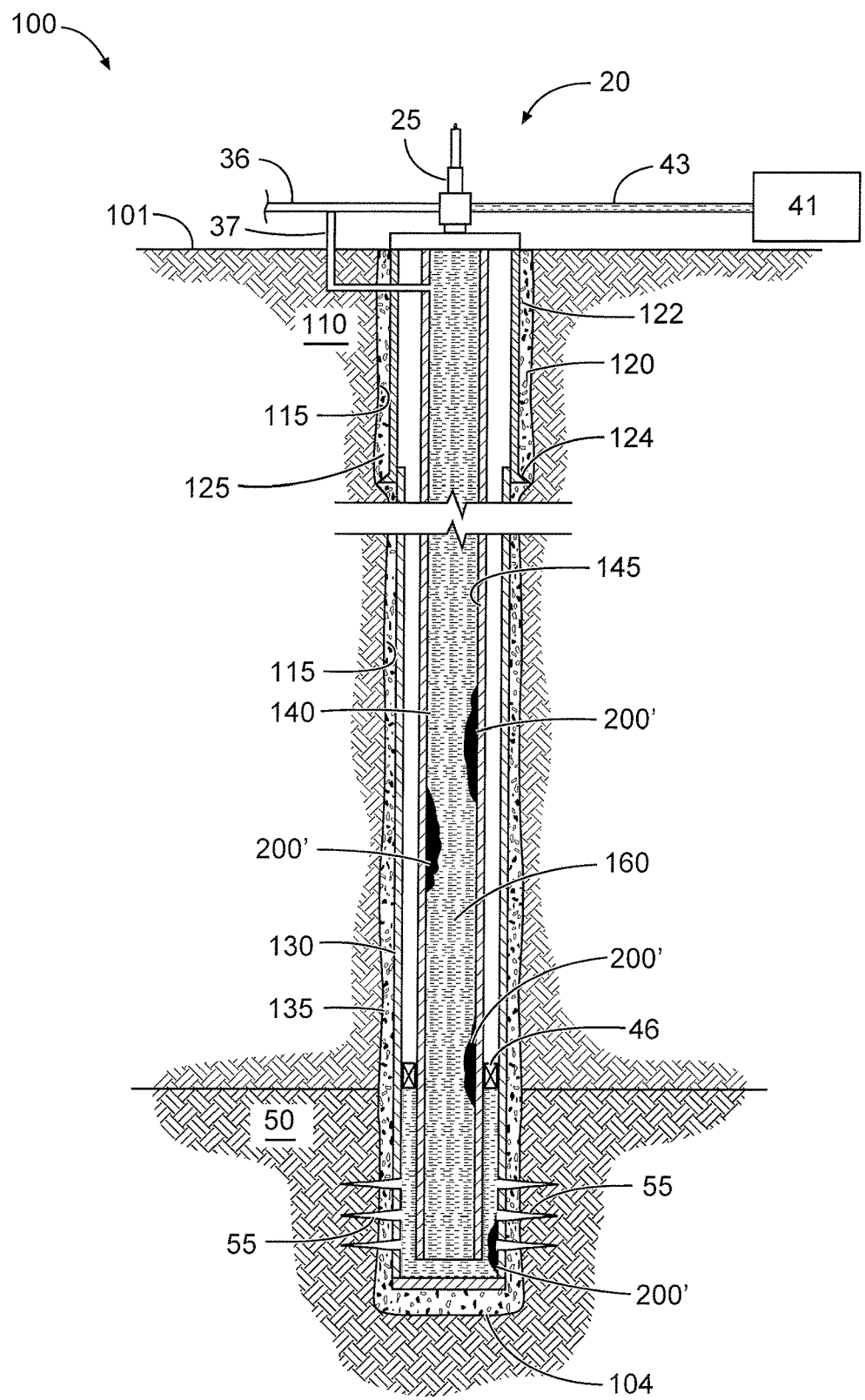
Figure 1C:
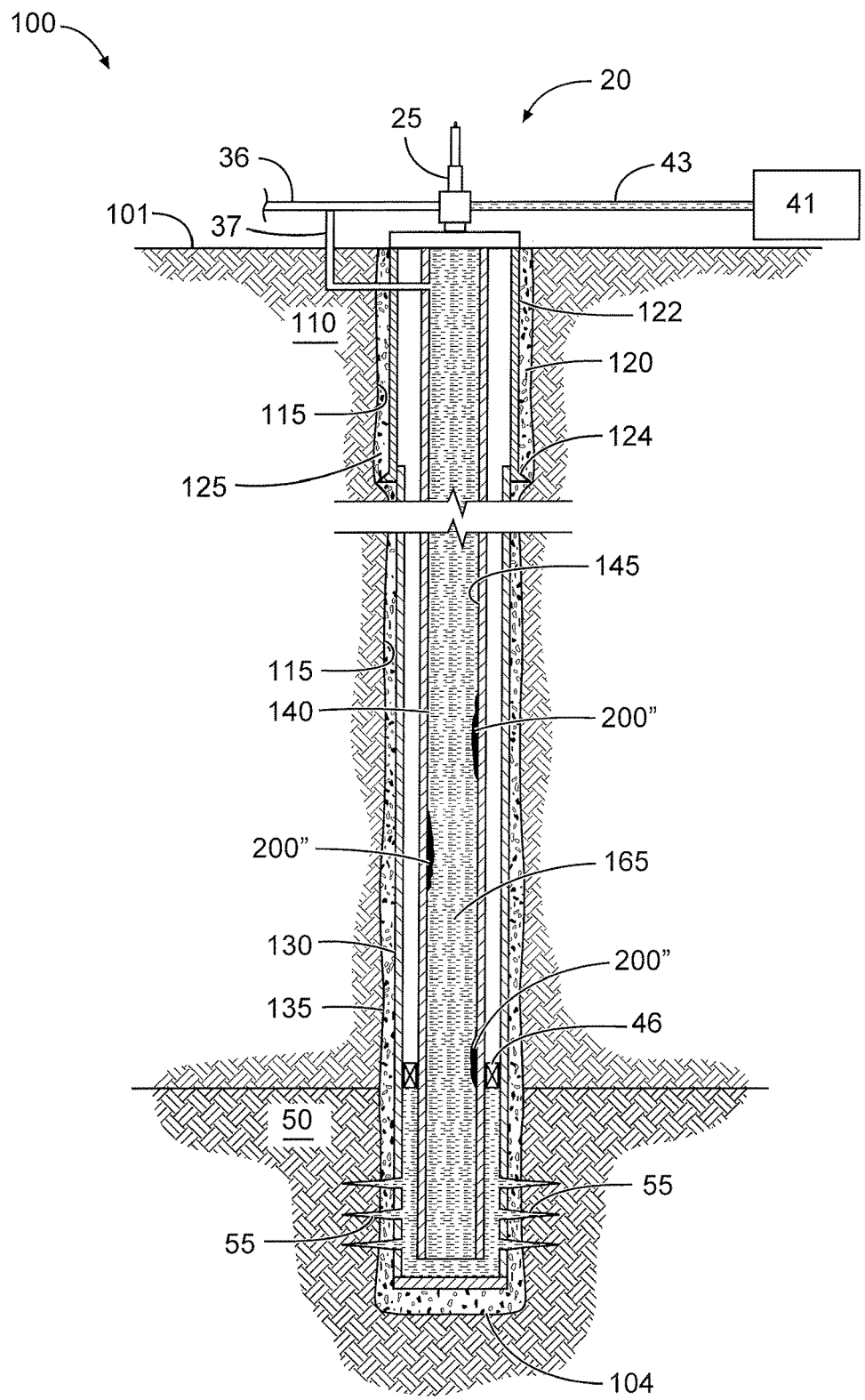

FIGS. 1A through 1C each show a cross sectional view of a well site 100 constructed for hydrocarbon production. The well site 100 generally includes a wellbore 150 and a wellhead 20. The wellbore 150 includes a bore 115 for receiving completion equipment and fluids. The bore 115 extends from a surface 101 of the earth, and down into the earth's subsurface 110. The wellbore 150 is first formed with a string of surface casing 120. The surface casing 120 has an upper end 122 in sealed connection with the well head 20. The surface casing 120 also has a lower end 124. The surface casing 120 is secured in the wellbore 150 with a surrounding cement sheath 125. The cement sheath 125 resides in an annular region formed between the surface casing 120 and the surrounding earth subsurface 110. The wellbore 150 also includes a lower string of casing 130. The lower string of casing 130 is also secured in the wellbore 150 with a surrounding cement sheath 135. The lower string of casing 130 extends down to a bottom 104 of the wellbore 150. The lower string of casing 130 traverses a hydrocarbon-bearing formation 50. Therefore, the lower string of casing 130 is referred to as production casing.

It is understood that the wellbore 150 may and likely will include at least one additional string of casing (not shown) residing between the surface (or conductor) casing 120 and the lower (or production) casing 130. These intermediate strings of casing may be hung from the surface. Alternatively, they may be hung from a next higher string of casing using a liner hanger. It is understood that the embodiments of the present disclosure are not limited to the type of casing arrangement used.

The wellbore 150 also includes a string of production tubing 140. The production tubing 140 extends from a tubing hanger at the well head 20, down proximate to the hydrocarbon-bearing formation 50. The production tubing 140 includes a bore 145 that transports production fluids from the hydrocarbon-bearing formation 50 up to the well head 20. The wellbore 150 further has a production packer 146. The production packer 146 sits just above or proximate to the top of the formation 50 and seals an annular area between the production tubing 140 and the surrounding casing 130. The production packer 146 keeps reservoir fluids from migrating behind the tubing 140 during production.

The well bore 150 may further comprise one or more pumps (not shown) installed in the production tubing 140 for lifting production fluids up to the surface 101. The pump may be, for example, an electrical submersible pump, a jet pump, a gas lift, or a hydraulic pump. In order to provide fluid communication between the hydrocarbon-bearing formation 50 and the production tubing 140, the production casing 130 has been perforated. A series of perforations are shown at 55. It is understood that the wellbore 150 may be completed using a pre-perforated pipe, a sand screen, a gravel pack, or some combination thereof in lieu of perforated casing.

As noted, the well site 100 also includes a well head 20, which includes a Christmas tree 25 that includes various valves spools, pressure gauges and chokes fitted to the wellhead of a completed well to control production and/or injection of fluids into the well. For example, well head 20 may include separate oil 36 and gas 37 production lines. In some embodiments, the well head 20 may be operatively connected to a pump jack, which may use sucker rods and/or other equipment used to operate pump 170.

It is understood that the well site 100 arrangement of FIG. 1 is merely illustrative. In some instances, the hydrocarbon-bearing formation 50 will possess sufficient reservoir pressure to allow production fluids to be produced to the surface 101 without need of a fluid pump 170 and/or other equipment. In that instance, a well head having a crown valve and/or master valves will be sufficient.

Referring now to FIGS. 1A through 1C, an example of a treatment of the present disclosure will be described. It is oftentimes desirable to treat certain of the wellbore components (such as the production tubing 140) for scale or corrosion. Referring now to FIG. 1A, for example, one or more deposits 200 comprising iron sulfides may reside inside the production tubing 140 and in the annular space between the production tubing 140 and the casing 130 near perforations 55. However, one of skill in the art would recognize that the methods and compositions of the present disclosure may be used to remove iron sulfide scales residing in any area of the well bore, formation, and/or equipment installed therein. In certain embodiments, one or more samples are taken of the material in deposits 200 prior to treatment, for example, using a downhole sampling tool such as a bailer (not shown) and/or by analyzing fluid samples taken from the well 150 at the surface 101. These samples may be analyzed to determine what types of iron sulfides are present in deposits 200.

Referring now to FIG. 1B, the same well site 100 from FIG. 1A is shown. A hydraulic pump and tank unit 41 is installed at or transported to the well site 100 and is connected to the wellhead 20 via injection line 43 to perform a treatment of the present disclosure. In a first stage of a treatment of the present disclosure, a first treatment composition 160 comprising an acid (and optionally, a hydrogen sulfide scavenger and a corrosion inhibitor) is injected into the production tubing 140 via line 43 and allowed to soak therein to partially dissolve the iron sulfide scale deposits 200, leaving portions 200' of those deposits remaining. Treatment composition 160 then may be circulated or pumped out of the production tubing 140 and well bore 150. In certain embodiments, following the first stage of the treatment, the remaining portions 200' of the iron sulfide scale deposits may comprise an "activated" surface, which may be more readily reactive with subsequent treatment solutions. Referring now to FIG. 1C (which depicts the same well site as FIGS. 1A and 1B), a second treatment composition 165 comprising an iron sulfide treating additive selected for its ability to dissolve or disperse one or more specific types of iron sulfide scales identified in the deposits 200 and/or 200' is injected into production tubing 140 via line 43. The treatment composition 165 then may be allowed to soak therein to further dissolve portions 200' of the deposits, which may be dissolved completely in some embodiments, or reduced to portions 200" as shown. Treatment composition 165 then may be circulated or pumped out of the production tubing 140, after which the well bore 150 may be returned to production.

To facilitate a better understanding of the present disclosure, the following examples of certain aspects of preferred embodiments are given. The following examples are not the only examples that could be given according to the present disclosure and are not intended to limit the scope of the disclosure or claims.

EXAMPLES

Example 1

Two equal-weight samples of an iron sulfide scale (comprising marcasite and mackinawite iron sulfides) taken from a well in the field were weighed and placed in beakers. The scale samples were mixed with one of (1) a 30% to 50% aqueous solution of an organic acid, or (2) a 30% to 50% solution of a chelator and allowed to stand for 240 minutes at 70° C. The organic acid solution dissolved approximately 38% (by weight) of the sample, and the YP-151-45-1 solution dissolved approximately 16% (by weight) of the sample. This demonstrates the performance of the single stage treatment.

Example 2

In this example, a sample of the same iron sulfide scale in Example 1 was weighed and placed in a beaker. The scale sample was first mixed with a 30% to 50% aqueous solution of the same organic acid as in Example 1, and allowed to stand for 240 minutes. The amount of scale dissolved in the organic acid solution (by weight) was measured, which was determined to be 38% by weight. Then, the remaining (undissolved) portion of the scale sample was mixed with a 30% to 50% solution of the same chelator as in Example 1 and allowed to stand for 120 minutes at 70° C. The amount of the scale dissolved in that solution (by weight) was then measured, which was determined to be 25% (by weight of the original sample). Thus, the first and second solutions together dissolved a total of 54% of the iron sulfide scale sample.

Example 3

In this example, another field sample of iron sulfide scale was weighed and placed in a beaker. The scale sample was first mixed with a 30-50% aqueous solution of the same organic acid as in Examples 1 and 2, and allowed to stand for 240 minutes. The amount of scale dissolved in the organic acid solution (by weight) was measured, which was determined to be 32% by weight. Then, the remaining (undissolved) portion of the scale sample was mixed with a 30-50% solution of the same chelator from Examples 1 and 2 and allowed to stand for 120 minutes at 70° C. The amount of the scale dissolved in that solution (by weight) was then measured, which was determined to be 35% (by weight of the original sample). Thus, the first and second solutions together dissolved a total of 56% of the iron sulfide scale sample.

An embodiment of the present disclosure is a multi-stage treatment method comprising: identifying one or more types of iron sulfide scale present in a portion of a subterranean formation; introducing a first treatment composition comprising an acid into at least a portion of the subterranean formation to partially dissolve the iron sulfide scale therein; and introducing a second treatment composition into the portion of the subterranean formation after the first treatment composition, the second treatment composition comprising an iron sulfide treating additive selected based at least in part on a type of iron sulfide scale identified in the subterranean formation.

Another embodiment of the present disclosure is a multi-stage treatment method comprising: identifying one or more types of iron sulfide scale present in a portion of a conduit or container; introducing a first treatment composition comprising an acid into at least a portion of the conduit or container to partially dissolve the iron sulfide scale therein; and introducing a second treatment composition into the portion of the conduit or container after the first treatment composition, the second treatment composition comprising an iron sulfide treating additive selected based at least in part on a type of iron sulfide scale identified in the conduit or container.

Another embodiment of the present disclosure is a multi-stage treatment method comprising: retrieving a sample of iron sulfide scale from a portion of a subterranean formation; identifying one or more types of iron sulfide scale present in the sample; introducing a first treatment composition comprising an acid into at least a portion of the subterranean formation to partially dissolve the iron sulfide scale therein, wherein at least a portion of the iron sulfide scale remains in a portion of the subterranean formation; and introducing a second treatment composition into the portion of the subterranean formation after the first treatment composition to at least partially dissolve the remaining portion of the iron sulfide scale, the second treatment composition comprising an iron sulfide treating additive selected based at least in part on a type of iron sulfide scale identified in the sample.

Another embodiment of the present disclosure is a multi-stage treatment method comprising: retrieving a sample of iron sulfide scale from a portion of a conduit or container; identifying one or more types of iron sulfide scale present in the sample; introducing a first treatment composition comprising an acid into at least a portion of the conduit or container to partially dissolve the iron sulfide scale therein, wherein at least a portion of the iron sulfide scale remains in a portion of the conduit or container; and introducing a second treatment composition into the portion of the conduit or container after the first treatment composition to at least partially dissolve the remaining portion of the iron sulfide scale, the second treatment composition comprising an iron sulfide treating additive selected based at least in part on a type of iron sulfide scale identified in the sample. Optionally in this embodiment or any other embodiment, at least one of the first and second treatment compositions are introduced into the portion of the conduit or container using one or more hydraulic pumps. Optionally in this embodiment or any other embodiment, the conduit or container comprises a pipeline for transporting hydrocarbons from one location to another.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A multi-stage treatment method comprising:
   identifying one or more types of iron sulfide scale present in a portion of a subterranean formation;
   introducing a first treatment composition comprising an acid into at least a portion of the subterranean formation to partially dissolve the iron sulfide scale therein; and
   introducing a second treatment composition into the portion of the subterranean formation after the first treatment composition, the second treatment composition comprising an iron sulfide treating additive selected based at least in part on a type of iron sulfide scale identified in the subterranean formation.

2. The method of claim 1 wherein at least a portion of the iron sulfide scale remains in a portion of the subterranean formation when the second treatment composition is introduced, and the method further comprises allowing the second treatment composition to at least partially dissolve the remaining portion of the iron sulfide scale.

3. The method of claim 1 further comprising introducing one or more spacer fluids into at least a portion of the subterranean formation after the first treatment composition and before the second treatment composition.

4. The method of claim 1 wherein identifying one or more types of iron sulfide scale present in a portion of the subterranean formation comprises retrieving a sample of iron sulfide scale from a portion of the subterranean formation.

5. The method of claim 1 wherein the iron sulfide treating additive comprises at least one additive selected from the group consisting of: a chelator; a reducing agent; acrolein; a weak acid; and any combination thereof.

6. The method of claim 5 wherein the chelator comprises at least one compound selected from the group consisting of: trishydroxymethylphosphine (THP); tetrakis(hydroxymethyl)phosphonium sulfate (THPS); ethylenediaminetetraacetic acid (EDTA); and any combination thereof.

7. The method of claim 1 wherein the first treatment composition further comprises a hydrogen sulfide scavenger.

8. The method of claim 1 wherein the first treatment composition further comprises a corrosion inhibitor.

9. The method of claim 1 wherein the first treatment composition further comprises a hydrogen sulfide scavenger and a corrosion inhibitor.

10. The method of claim 1 wherein the acid comprises at least one organic acid.

11. The method of claim 1 wherein at least one of the first and second treatment compositions are introduced into the portion of the subterranean formation using one or more hydraulic pumps.

12. A multi-stage treatment method comprising:
    identifying one or more types of iron sulfide scale present in a portion of a conduit or container;
    introducing a first treatment composition comprising an acid into at least a portion of the conduit or container to partially dissolve the iron sulfide scale therein; and
    introducing a second treatment composition into the portion of the conduit or container after the first treatment composition, the second treatment composition comprising an iron sulfide treating additive selected based at least in part on a type of iron sulfide scale identified in the conduit or container.

13. The method of claim 12 wherein the conduit or container comprises a pipeline for transporting hydrocarbons from one location to another.

14. The method of claim 12 wherein identifying one or more types of iron sulfide scale present in a portion of the conduit or container comprises retrieving a sample of iron sulfide scale from a portion of the conduit or container.

15. The method of claim 12 wherein the acid comprises at least one organic acid.

16. The method of claim 12 wherein the iron sulfide treating additive comprises at least one additive selected from the group consisting of: a chelator; a reducing agent; acrolein; a weak acid; and any combination thereof.

17. The method of claim 12 wherein the first treatment composition further comprises a hydrogen sulfide scavenger and a corrosion inhibitor.

18. A multi-stage treatment method comprising:
    retrieving a sample of iron sulfide scale from a portion of a subterranean formation;
    identifying one or more types of iron sulfide scale present in the sample;
    introducing a first treatment composition comprising an acid into at least a portion of the subterranean formation to partially dissolve the iron sulfide scale therein, wherein at least a portion of the iron sulfide scale remains in a portion of the subterranean formation; and introducing a second treatment composition into the portion of the subterranean formation after the first treatment composition to at least partially dissolve the remaining portion of the iron sulfide scale, the second treatment composition comprising an iron sulfide treating additive selected based at least in part on a type of iron sulfide scale identified in the sample.

19. The method of claim 18 wherein the acid comprises at least one organic acid.

20. The method of claim 18 wherein the iron sulfide treating additive comprises at least one additive selected from the group consisting of: a chelator; a reducing agent; acrolein; a weak acid; and any combination thereof.

* * * * *